United States Patent [19]

Gamaunt

[11] 3,977,693
[45] Aug. 31, 1976

[54] HEAVY DUTY VEHICLE CHASSIS AND STEERING MECHANISM THEREFOR

[76] Inventor: Roger L. Gamaunt, P.O. Box 55, Fawnskin, Calif. 92333

[22] Filed: Dec. 30, 1974

[21] Appl. No.: 537,184

[52] U.S. Cl.................................. 280/91; 180/79.3; 180/24; 180/45; 280/81.5; 280/99; 280/109; 280/112 A
[51] Int. Cl.².................... B62A 61/10; B62A 3/02
[58] Field of Search............ 280/104.5 A, 91, 81.5, 280/87, 96.1, 105, 110, 111, 109, 112 A, 99; 180/79.2 C

[56] References Cited
UNITED STATES PATENTS

| | | | |
|---|---|---|---|
| 696,596 | 4/1902 | Robinson | 280/111 |
| 1,935,746 | 11/1933 | Marcum | 280/91 |
| 2,699,222 | 1/1955 | Van Doorne | 280/104.5 A X |
| 2,804,158 | 8/1957 | Yunker | 280/91 X |
| 2,819,911 | 1/1958 | Ranta | 280/104.5 A |
| 2,874,973 | 2/1959 | Botkin | 280/104.5 A |
| 2,950,124 | 8/1960 | Pribonic | 280/112 A X |
| 2,967,062 | 1/1961 | D'Avigdor | 280/112 A |
| 3,008,729 | 11/1961 | Müller et al. | 280/112 A |
| 3,704,897 | 12/1972 | Bagge | 280/91 |
| 3,774,934 | 11/1973 | McGee | 280/112 A X |

Primary Examiner—Wood, Jr. M. H.
Assistant Examiner—John P. Silverstrim
Attorney, Agent, or Firm—Roger A. Marrs

[57] ABSTRACT

A chassis for a heavy duty vehicle is disclosed herein having an elongated box frame supported on an undercarriage of articulated wheel sets. The undercarriage includes a front wheel set carried on one end of the frame by a pivoting torque box having trailing pivotal arms for rotatably supporting the front wheels. A pair of rear wheel sets include a pair of wheel axles carried on trailing arms and controlled by a walking beam assembly and having shock-absorbers and an air cushion device interconnecting the beam assembly with the frame. The pivot coupling at the front wheel torque box with the frame and the beam assemblages interconnecting the frame with the rear wheel sets constitute a three point suspension for the frame. A progression steering mechanism is provided including an eliptical sprocket and chain arrangement which intercouples the rear wheel set with the steering for the front wheel set via a drive shaft operably extending therebetween.

16 Claims, 9 Drawing Figures

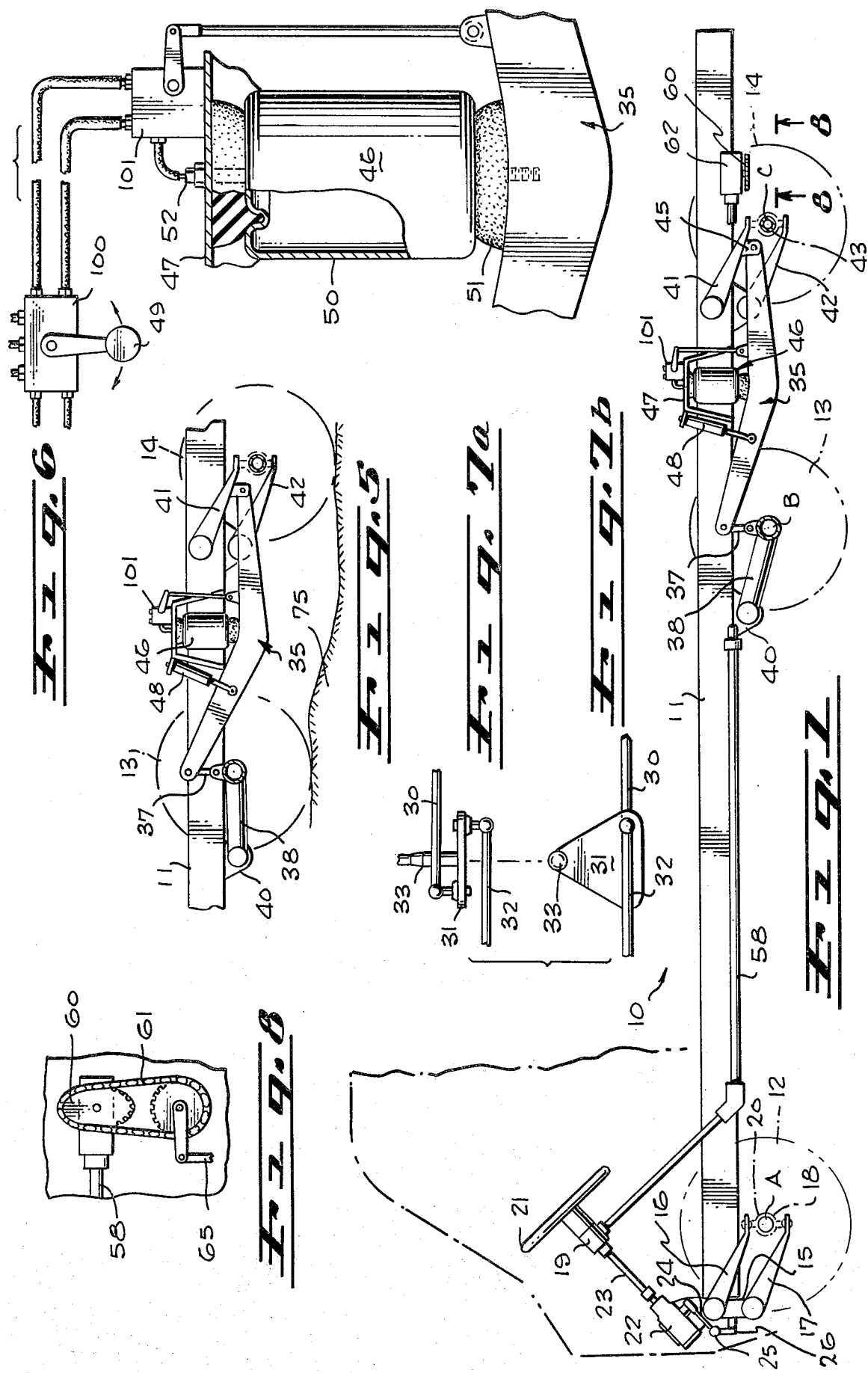

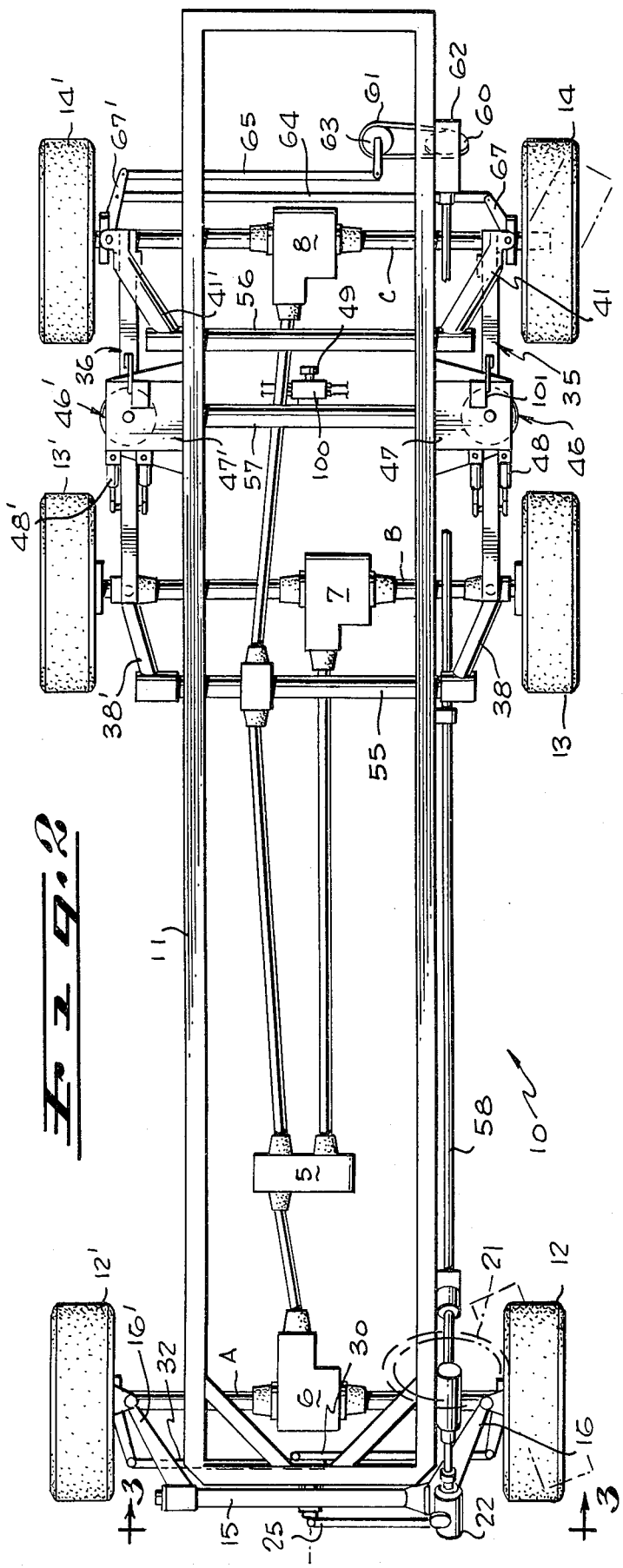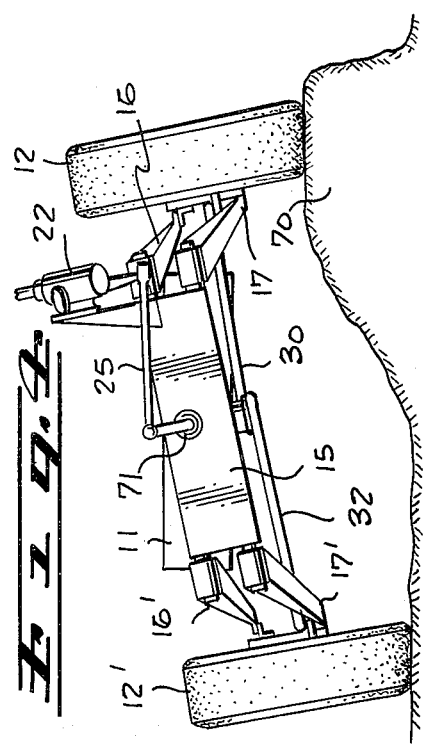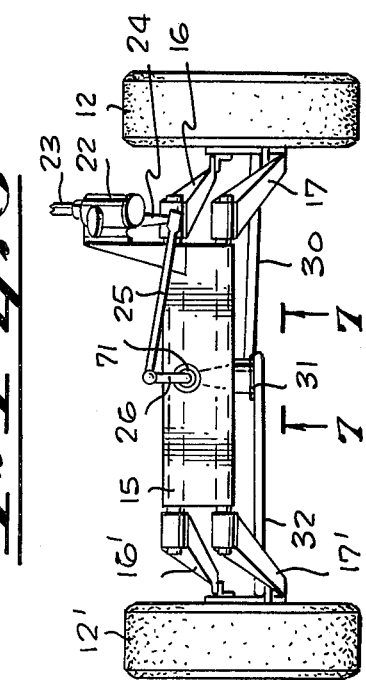

3,977,693

HEAVY DUTY VEHICLE CHASSIS AND STEERING MECHANISM THEREFOR

BACKGROUND OF THE INVENTION

1. Field of the Invention

This invention relates to heavy duty vehicles or the like for on or off road travel as may be classed as rough terrain vehicles and more particularly to such a vehicle having an articulate box frame incorporating three point suspension and rear wheel progressive steering.

2. Brief Description of the Prior Art

In the past, it has been the conventional practice in the design and construction of heavy duty vehicles such as trucks, cargo carriers, busses, ambulances, cars and the like to provide a rigid frame or chassis having the carrying ability to transport heavy loads over highways and unimproved roads and somewhat rough terrain. Most of these prior vehicles are not capable of operating satisfactorily in rough terrain due to the fact that no means are provided for off-setting the high torque loads applied to the chassis, equalizing the load to the chassis or for maintaining the support wheels of the various axles equally loaded in contact with the terrain over which the vehicle passes. Furthermore, no mechanism is provided for compensating or load leveling the chassis while the vehicle is traveling on angled banks, crowned highways or roadways. In such prior designs, it is common practice to employ walking beams to support the axles in order to maintain adequate surface engagement or contact between the support wheels and the terrain over which the vehicle passes. When wheels are attached directly to the walking beams, problems are encountered when braking is initiated. For example, the resistance of the front walking beam wheel tends to tuck under which causes the rear wheel to rise from surface contact and be less effective in braking. The opposite effect is encountered in acceleration with a tendency to raise the forward wheel from surface contact.

While the development of prior heavy-duty multiple axle vehicles has been the subject of a substantial amount of design and research, it has been found that costly vehicle repairs result from the high torsional loads applied to the vehicle chassis. Therefore, in most cases where roads do not exist, dirt and sometimes asphalt roads are provided.

Still another problem with conventional heavy-duty vehicles resides in the scuffing of wheels when the vehicle is rounding a curve such as in the case of a vehicle having more than two axles.

Therefore, a long standing need has existed to provide a vehicle chassis capable of operating in rough terrain having a construction for compensating applied torsional loads, for equalizing the load while traveling on angled or crowned roadways and for maintaining wheel surface contact under a variety of vehicle operating conditions.

SUMMARY OF THE INVENTION

The problems and difficulties encountered with conventional heavy-duty vehicles are obviated by the present invention which includes an elongated box frame or chassis on which the load for the vehicle is carried. The chassis is movably carried on a front wheel set and a pair of rear wheel sets arranged in an assembly. The front wheel set is pivotally connected to the front of the chassis for limited rotation about the central longitudinal axis by a pivotal connection so that, in effect, a three-point suspension means for the frame or chassis is provided in combination and cooperation with resilient and pivotal mounting of the rear wheel sets. In one form of the invention, the rear wheel sets are carried on a pivotal linkage constituting trailing arms depending from the chassis that are interconnected by a walking beam assembly. Shock absorbing means movably connect the center of the walking beam assembly with the chassis. A further feature of the invention includes torsion suspension for the front wheel set and a further feature resides in interconnecting the front steering mechanism to both the front wheel set and to the rear wheel set by an interconnecting drive rod including a chain and elliptical sprocket arrangement so that a progressive steering means for the rear wheel set is established.

Therefore, it is among the primary objects of the present invention to provide a novel heavy-duty vehicle having an articulated chassis for providing equalized loading on the wheeled suspension therefor while traversing an irregular surface, thus preventing any torsional loads in the chassis.

Another object of the present invention is to provide a novel vehicle chassis for a surface vehicle having progressive steering operably connected between the front wheel set and the rear wheel set so as to provide the stability of a long wheel base vehicle at cruise and high speed while providing greater maneuverability capability at low speeds and while negotiating tight corners and rough terrain.

Another object of the present invention is to provide a novel heavy-duty vehicle having an articulated chassis adapted to rotate about its longitudinal center line through a pivotal connection between a front torque box and the front chassis and through adjustment of load leveling resilient means such as air springs.

Still a further object of the present invention is to provide a novel heavy-duty multiple axle vehicle having a substantially rigid frame with improved three axle suspension adapted to be responsive for pitch and roll movement relative to the frame, thereby providing, in effect, a three-point suspension for the frame.

Still a further object of the present invention is to provide an improved heavy-duty or cargo vehicle having a rigid frame and front and rear steerable wheel sets for increased stability and cornering characteristics and having pivotal front and rear suspension of the frame for accommodating limited twisting movement.

The features of the present invention which are believed to be novel are set forth with particularity in the appended claims. The present invention, both as to its organization and manner of operation, together with further objects and advantages thereof, may be understood best by reference to the following description taken in connection with the accompanying drawings.

BRIEF DESCRIPTION OF THE DRAWINGS

FIG. 1 is a side elevational view of the novel heavy duty vehicle chassis incorporating the present invention;

FIG. 2 is a top plan view of the chassis shown in FIG. 1;

FIG. 3 is a front elevational view of the chassis as taken in the direction of arrows 3—3 of FIG. 2;

FIG. 4 is a view similar to the view of FIG. 3 illustrating the pivotal articulation of the wheel sets with respect to the chassis in a typical encounter with uneven roadway or terrain;

FIG. 5 is a partial side elevational view of the rear wheel sets illustrating a typical encounter of the rear wheels with uneven terrain;

FIG. 6 is an enlarged elevational view of the air spring or cushion means shown in FIGS. 1 and 2;

FIGS. 7 a and b are enlarged views of the front steering joint as taken in the direction of arrows 7—7 of FIG. 3; and FIG. 8 is a plan view of the sprocket mechanism incorporated into the progressive steering apparatus for the rear wheel set shown in FIG. 1 as taken in the direction of arrows 8—8 thereof.

DESCRIPTION OF THE PREFERRED EMBODIMENT

Referring to FIG. 1, the novel vehicle chassis incorporating the present invention is indicated in the general direction of arrow 10 and the invention includes a box frame or chassis 11 which includes a front end and a rear end connected together by parallel beam members. The frame 11 is employed to support any one of a varieties of vehicle body configurations and such configuarations do not constitute a part of the present invention. Furthermore, the chassis for frame 11 may support suitable drive means such as a conventional engine (not shown) that is operably coupled to any one of the wheel sets for driving purposes. The drive means includes a drive train having powered axles A, B and C operably coupled to a common transfer box 5 via differentials 6, 7 and 8 and associated drive shafts. It is understood that universal joints interconnect adjacent components such as the ends of axles with respective wheel spindles and the drive shafts with their respective differentials. The universal joints are illustrated diagrammatically.

In the view of FIG. 1, it can be seen that the frame 11 is supported on the ground in a rollable manner by a front wheel set 12 and a pair of rear wheel sets 13 and 14. The front wheel set 12 is carried immediately behind a front torque box 15 by means of a pair of trailing arms 16 and 17 associated with each side of the box frame 11. It is noted that the trailing arms 16 and 17 are substantially parallel with respect to each other and are pivotally connected at their opposite ends to the side of torque box 15 and to a common spindle 18 carried on the backside of each wheel and fixedly supported to the axle housing 20. Steering of the front wheel set is achieved via an operator's steering wheel 21 operably coupled to a turning gear or box 22 by a steering shaft 23 and a steering box 19. The steering box and wheels are attached as a single unit. The steering wheel and steering box are attached by way of a slip-splined shaft and a pair of U-joints. The turning box 22 is operably connected to the torque box 15 via linkages 24, 25 and 26 so that the steering box and wheels are attached as a single unit.

As shown more clearly in FIGS. 3 and 7, the steering movement of the operator's wheel 21 is transferred by various linkages as indicated by link 30, lever 31 and link 32 and the pivotal connection to the frame 11 as indicated by numeral 33.

Continuing with the description of FIG. 1, it can be seen that the rear wheel sets 13 and 14 are carried on axles B and C which are supported from opposite ends of a walking beam assembly comprising walking beams 35 and 36 separated by the frame 11. Walking beam 35, for example, is connected to axle B associated with wheel set 13 by means of a connecting link 37 pivotally connected at its opposite end to walking beam 35 and axle B respectfully. Movable support for axle B is also given by means of a trailing connecting tube 38 which is fixedly secured to the axle B at one end and is pivotally connected to a bracket 40 attached to the frame 11. Suspension for the wheel set 14 is achieved by trailing arms 41 and 42 which are carried on one end to spindle 43 fixed to axle C while the opposite ends of the trailing arms 41 and 42 are pivotally carried on the frame 11. Suspension for the wheel set 14 further includes pivotal connection at trailing arm bracket 45 with one end of the walking beam 35. Therefore, it can be seen that the walking beam 35 pivotally supports wheel sets 13 and 14 on one side of frame 11.

Shock absorbtion for the wheel sets 13 and 14 are provided by air spring means such as an air cushion or bag device 46 connected at one end to bracket 47 fixed to frame 11 and at its opposite end to the mid-section or center point of walking beam 35. It is to be understood that a similar type of air bag or cushion 46 is associated with the opposite side of the frame 11. In addition to the air bag device 46, a pair of shock absorbers 48 are provided. These air bags may be inflated or deflated by the operator by means of air valve 52. To accommodate full articulation, it is to be noted that the air bag devices on either side of frame 11 provide points which operate with the front torque box pivot 71 to provide three point suspension. In other words, the three point suspension includes a pivotal connection 71 coupling the front wheel set to one end of the chassis and a pair of resilient air springs 46 and 46' attached between the rear wheel set and the other end of the chassis whereby the front pivotal means allows rotation of the front wheel set without changing geometry of the front steering mechanism.

Referring now in detail to FIG. 6, it can be seen that the air bag device 46 comprises an outer housing 50 that is arranged in telescoping relationship with respect to an innercore 51. The core 51 is suitably attached to the walking beam 35 while the outer housing 50 is fixedly coupled to the fixed bracket 47. The air inlet or valve arrangement 52 is provided for introducing air to the interior of the bag or exhausting same as desired. To provide a comfortable ride in the condition of vehicle roll, a pendulum operated air valve 100 or suitable electrically controlled device connected to an air reservoir and a compressor (not shown) and two conventional limiting air valves 101 has been provided. The limiting valves are normally open valves and are closed just prior to the air spring reaching their collapsed or extended limits. By using a pendulum 49, control is gained for the roll of the vehicle. When the pendulum is in a neutral position, it operates a valve in air valve 100 that maintains the rear of the vehicle at normal operating height. When the valve moves in relationship to the vehicle, caused by the vehicle starting to roll, it will open one valve allowing greater air pressure to the air spring on one side and opening a valve on the opposite side releasing the air at the opposite side. In this manner, roll in the vehicle is eliminated within the limits of the air springs. The pendulum valve removes negative roll of the vehicle when entering a turn causing the vehicle to lean into the turn such as an airplane banking into a turn. This adds greatly to the comfort of the passengers. The anti-roll device would also be important in ambulances, cars, instrument carriers, explosive carriers and any other vehicles requiring a smooth controlled ride.

Referring now in detail to FIG. 2, it can be seen that various elements shown in FIG. 1 are repeated as identical elements and items on the opposite side of frame 11. These identical elements are indicated by prime associated with the same number corresponding to an identical part on the opposite side of frame 11. Furthermore, it can be seen that the connecting links or tubes 38 and 38' are associated on opposite ends of a connecting tube indicated by numeral 55 which is a transverse member extending across frame 11. A similar type of tube is indicated by numeral 56 which is associated with trailing arms 41 or 41'. A fixed rod 57 further represents a transverse support beam for the mounting of pendulum control valve 100.

FIG. 2 further illustrates that a rear steering shaft or rod 48 is connected at one end to the steering column at the front of frame 11 while the opposite end is coupled to the extreme rear wheel set 14 by an elliptical sprocket and chain relationship indicated by numerals 60 and 61 respectively. The end of steering rod 58 enters a gear box 62 in operable relationship with respect to elliptical sprocket 60. Through the chain 61 and the sprocket 63, rotational movement is translated to pivotal steering linkages 64 and 65 and the connecting links 67 and 67' cause the rear wheel set to rotate as shown in the broken lines. By this means, a progressive steering system for the rearmost wheel set is provided that prevents scuffing of the tires on the roadway and allows for greater maneuverability and vehicle handling when the vehicle is negotiating turns or corners. When the vehicle is travelling in a straight direction, the progressive steering system is not in operation.

When either front wheel rolls over a bump or through a large hole, the steering inputs to the wheel do not change. The steering wheel remains fixed in a normal position at all times. The progressive steering gives the vehicle the stability of a long wheel base vehicle at cruise and high speed and the greater maneuverability capability at low speeds and while traversing tight corners and rough terrain. The elliptical sprocket attached to the rear steering gear box drives a round sprocket of the same outer circumference as the elliptical sprocket. When the input of the steering wheel is applied to the rear steering box, the elliptical sprocket starts to turn, but, due to its shape and its positioning, it retards the movement of the round sprocket during its first few degrees of movement and then accelerates the movement of the round sprocket until reaching 90° of movement. Only 45° of movement is used in this application. Thus, the front wheels do the steering at high speeds or during highway travel where a long wheel base gives greater stability. The rear wheels are not turning at this point due to the retardation of the elliptical sprocket. The rear wheels start to turn after the front wheels have progressed through 3° of turn angle.

FIG. 8 more clearly shows the steering system for providing the progressive translation of rear wheel rotation with respect to the front wheels. It is to be understood that other forms of mechanism may be provided for effecting the progressive translation of such movement besides the elliptical sprocket and chain arrangement illustrated.

Referring now in detail to FIGS. 3 and 4, it can be seen that the front wheel set 12 when engaging in uneven terrain such as is represented by mount 70 in FIG. 4, causes the front end of the vehicle to pivot about pivot joint 71 while the frame or chassis 11 maintains horizontal stability. In FIG. 3, the torque box 15 is horizontal and level with the chassis 11 while in FIG. 4, the chassis 11 is maintained level while the torque box and front wheel set are angularly disposed with respect to the frame. The connection 71 of the steering system is universally mounted to the frame so that the angular relationship can be maintained between the torque box and the chassis.

Referring now in detail to FIG. 5, it can be seen how the rear wheel set operates to accommodate an uneven terrain as represented by the mound 75. The wheel set 13 is shown on top of the mound in which case the walking beam 35 pivots so that its forward end is raised above the position as shown in FIG. 1 and this, in turn, causes the lifting of the connecting link 38. Connecting link 38 rotates about its fixed connection with bracket 40 to frame 11. By this means, the unevenness of the roadway surface is accommodated by the rear wheel set and the elevation or attitude of frame 11 is unchanged. The wheels are attached to trailing arms and the walking beams are only the structure employed to carry the load between the frame and wheels. Hence, there are no over-turning loads so the vehicle has equal braking and acceleration. Yet, with the higher wheel movement of a walking beam and the one-half movement of the chassis to the wheels, the advantages of walking beams are gained but not the disadvantages.

Therefore, it can be seen that by employing the three-point suspension means (a pair of spring or cushion means 46 and 46' cooperating with pivot connection 71) of the present invention for rollably supporting frame 11 on the wheel sets and by employing the progressive steering mechanism for the rear wheel set 14, a greatly improved and stabilized mounting for the chassis 11 is achieved. Such means accounts for roll and angular displacement of the undercarriage of wheel set without change in attitude or stability of the load carrying chassis. The front wheel set pivot and the pivots of the air springs allows rotation of the front wheel set without changing the geometry of said front steering mechanism. This feature is portrayed in FIG. 4. The steering of the rearmost wheel set is in a linear progression relationship with respect to the turning of the front wheel set. In other words, both wheel sets turn simultaneously but at different angular positions.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A vehicle comprising:
   a rigid chassis;
   a front wheel set;
   a pivotal means on the central longitudinal axis of said chassis coupling said front wheel set to one end of said chassis allowing rotation of said front wheel set about said axis;
   a front steering mechanism for steering said front wheel set mounted on said front wheel set for pivotal movement therewith about said pivotal means, whereby said pivotal means allows directional rotation of said front wheel set without changing the geometry of said front steering mechanism;
   a rear wheel set;

a pair of resilient means on opposite sides of said chassis, respectively, mounting said rear wheel set on the other end of said chassis; and a progressive rear steering mechanism connected to said front steering mechanism for turning said rear wheel set at a differential rate with respect to turning of said front wheel set.

2. The invention as defined in claim 1 including anti-roll means operatively coupled between said resilient means and said chassis for reducing chassis roll in the vehicle; and limiting means interconnected between said anti-roll means and said chassis for reducing roll in the vehicle within operational limits of said anti-roll means.

3. The invention as defined in claim 1 wherein said resilient means includes a walking beam assembly mounting said rear wheel set having its opposite ends pivotally attached to the sides of said chassis;

a forward end of said walking beam assembly coupled to said chassis by a pivotal trailing connecting tube and a rear end of said walking beam assembly coupled to said chassis by a pair of pivotal trailing arms.

4. The invention as defined in claim 3 wherein said resilient means interconnects said walking beam assembly with said chassis at substantially the center of said assembly for rotation about axes substantially parallel to the rotation axes of said wheels.

5. The invention as defined in claim 1 wherein said rear wheel set includes a pair of walking beams mounted on said chassis by said pair of resilient means, respectively, and a trailing arm means pivotally connecting each end of each walking beam to said chassis.

6. The invention as defined in claim 1 wherein said resilient means includes a walking beam assembly fulcrumed medially of its respective length constituting the sole structure employed to carry loads between said chassis and said rear wheel set.

7. The invention as defined in claim 1 wherein said front wheel set comprises a torque box pivotally connected to said chassis by said pivotal means, and trailing arm means pivotally attaching the front wheels to said torque box.

8. The invention as defined in claim 7 wherein said rear wheel set comprises additional trailing arm means pivotally connected to said chassis, the rear wheels being mounted on said additional trailing arm means, and said resilient means comprises a walking beam assembly pivotally mounted to said chassis and to said additional trailing arm means.

9. The invention as defined in claim 1 wherein said progressive rear steering mechanism includes means for turning said rearmost wheel set in a progression relationship with respect to the turning of said front wheel set.

10. In combination with a heavy-duty vehicle for traversing rough terrain, said vehicle having:

an elongated box chassis;

a multiaxle suspension having a pair of walking beams separated by said chassis;

an air spring means coupling said walking beams mid-way between their opposite ends to said chassis in a downwardly depending relationship so as to constitute a fulcrum for rotation about a transverse axis of said chassis;

a first set of trailing arms pivotally secured at one end to said chassis and secured to a first axle at their opposite end;

a pivotal link interconnecting said first axle to one end of said walking beam;

a second set of trailing arms connecting said chassis to a second axle;

a pivotal connection coupling said second set of trailing arms to the other end of said walking beam;

support wheels journaled on each end of each of said axles;

steering mechanism including front steering means interconnecting a front support wheel set with said chassis and means operably coupling said front steering means with the wheels of the rearmost one of said rear axles so that simultaneous, but differential rotation of said front and said rearmost wheels is produced; and said steering coupling means includes an elliptical sprocket and chain arrangement operably coupling said steering coupling means to said rearmost wheel set.

11. The invention as defined in claim 10 wherein said multiaxle suspension includes a pivotal connection of said front wheel set to said chassis for rotation of said front wheel set about the central longitudinal axis of said frame chassis allowing rotation of said front wheel set without changing geometry of said front steering means.

12. The invention as defined in claim 11 wherein said front steering means includes a torque box supporting said front wheel set and said pivotal connection rotatably joining said torque box with said chassis so that said torque box including said front wheel set rotates without changing steering directional rotation of said front steering means and said chassis.

13. A vehicle chassis comprising:

an elongated box frame;

a front wheel set and at least a pair of rear wheel sets rollably supporting said frame;

a pivot connection between said frame, along its central longitudinal axis, and said front wheel set; a pair of resilient means connecting said pair of rear wheel sets to said frame on opposite sides thereof, respectively;

a steering mechanism operably connected to said front wheel set via said pivot connection lying on the central longitudinal axis of said frame and operatively interconnected by coupling means between said front wheel set and a rearmost rear wheel set of said pair of rear wheel sets whereby said rearmost rear wheel set turns in a predetermined differential progression simultaneously with turning of said front wheel set.

14. The invention as defined in claim 13 wherein said coupling means further includes an elliptical gear and chain arrangement for effecting simultaneous, but differential rotation of said wheel sets.

15. The invention as defined in claim 13 wherein said steering mechanism includes a torque box supporting said front wheel set and said pivotal connection rotatably joining said torque box with said chassis so that said torque box including said front wheel set rotates without rotation of said chassis.

16. The invention as defined in claim 13 wherein said pair of resilient pivot means constitute anti-roll means operably connected between said suspension means and said chassis for reducing chassis roll in the vehicle; and limiting means interconnected between said anti-roll means and said chassis for reducing roll in the vehicle within operational limits set by said anti-roll means.

* * * * *